United States Patent [19]

Hicks

[11] Patent Number: 5,269,053
[45] Date of Patent: Dec. 14, 1993

[54] COMPACT DISC BRAKE PISTON RETRACTION TOOL AND METHOD FOR RETRACTING DISC BRAKE PISTON

[76] Inventor: Robert L. Hicks, 2404 Nottingham, Denton, Tex. 76201

[21] Appl. No.: 940,390

[22] Filed: Sep. 3, 1992

[51] Int. Cl.⁵ .......................... B23P 6/00; B29C 73/00
[52] U.S. Cl. .................................. 29/402.01; 29/239; 29/256; 29/259; 29/266
[58] Field of Search ................ 29/239, 256, 258, 259, 29/264, 266, 274, 402.01, 520, 801, 888.041; 254/100, 101; 269/249; 81/176.1, 176.15, 176.2

[56] References Cited

U.S. PATENT DOCUMENTS

| | | | |
|---|---|---|---|
| 2,103,115 | 12/1937 | Mizzy et al. | 254/100 X |
| 2,697,583 | 12/1954 | Riordan | 254/100 |
| 3,727,490 | 4/1973 | Diffenderfer et al. | 29/239 X |
| 4,027,373 | 6/1977 | Kwast et al. | 29/239 X |
| 4,086,828 | 5/1978 | Mader | 29/239 X |
| 4,288,899 | 9/1991 | McKee | 29/256 |
| 4,288,900 | 9/1981 | Overton | 29/263 |
| 4,809,567 | 3/1989 | Bongard | 29/239 X |
| 4,833,767 | 5/1989 | Parkins | 29/239 |
| 4,903,391 | 2/1990 | Franks | 29/266 X |
| 5,003,681 | 4/1991 | Schley | 29/239 |
| 5,018,261 | 5/1991 | Markous | 29/266 X |

Primary Examiner—Timothy V. Eley
Assistant Examiner—C. Richard Martin
Attorney, Agent, or Firm—Jasper C. Rowe

[57] ABSTRACT

A compact disc brake piston retraction tool and method for retracting a disc brake piston is provided for moving a disc brake piston into a retracted position in the cylinder position in the cylinder bore of a disc brake caliper in order to allow the replacement of worn disc brake pads. The tool includes a threaded bolt, and a threaded collar, which bolt-collar assembly can operate alone or be attached to a brace support wall to enable the invention to be braced against the caliper arms opposite the brake piston to allow pressure to be exerted on the disc brake piston by the rotation of the collar around the threaded bolt thereby causing the bolt-collar assembly to lengthen and exert pressure against the disc brake piston by a variety of means such as directly, by a piston bearing plate, or a brake pad attached to the brake piston. The present invention can use a brace support wall or omit it and, can either use a piston bearing plate and/or collar journal collar end cap to transfer the pressure to the disc brake piston to force the piston back into the cylinder bore. Methods of using the invention are also provided.

16 Claims, 7 Drawing Sheets

SECTION TAKEN FROM A TO B

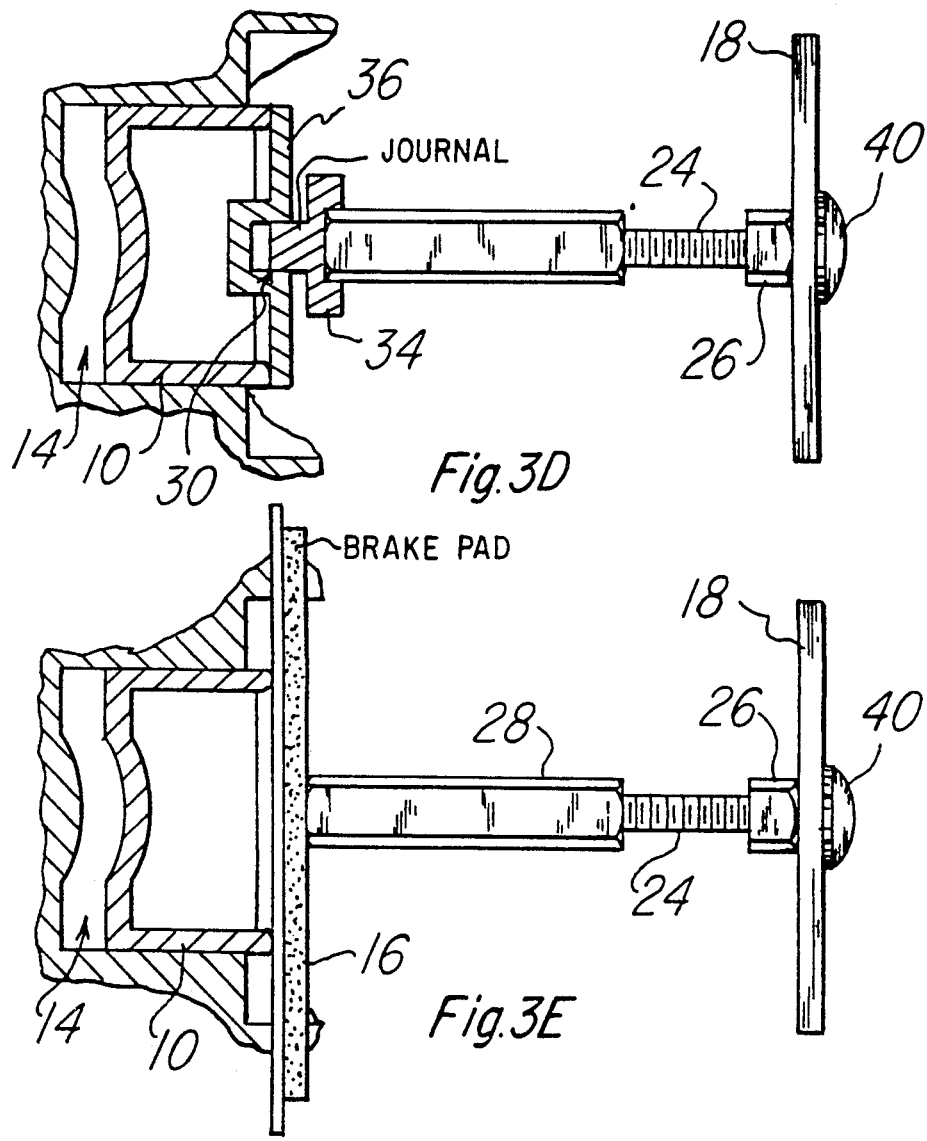

COMPACT DISC BRAKE PISTON RETRACTION TOOL AND METHOD FOR RETRACTING DISC BRAKE PISTON

TECHNICAL FIELD

This invention relates in general to tools and methods for changing disc brake pads on a disc brake caliper assembly and, in particular to an apparatus and method for moving a disc brake piston into a retracted position into the cylinder bore of a fluid containment chamber of a disc brake caliper in order to allow the replacement of worn disc brake pads without manually removing hydraulic fluid from the system.

BACKGROUND OF THE INVENTION

In motor vehicles a brake assembly is usually provided at each ground wheel. Sometimes disc brakes are provided on these wheels.

A conventional disc brake assembly comprises a circular disc connected to the road wheel, and a disc brake caliper mechanism encircling an edge area of the disc at or near the twelve o'clock position. A piston contained within a cylinder bore acts within the caliper mechanism on disc brake pads arranged along opposite faces of the rotating disc to exert a clamping force thereon when the motorist applies foot pressure to the brake pedal.

After a period of service the brake pads become worn, thereby necessitating their removal and replacement with new brake pads. One problem encountered during the brake pad replacement operation is retraction of the associated piston into the its cylinder bore. During service the disc brake pads become worn and thus thinner. When it becomes necessary to replace the pads because they have become too thin for effective operation, the brake cylinder piston is in an extended position projecting a significant distance out of the associated disc brake cylinder bore. Before new pads can be inserted into the caliper mechanism it is necessary to forcibly retract the piston back into the cylinder bore (because the new pads are appreciably thicker than the worn pads, and therefore take up more axial space in the caliper mechanism). Retraction of the disc brake piston into the cylinder is made difficult because the brake fluid in the piston is in a semi-pressurized condition. Also, the piston seals offer some resistance to disc brake piston motion into the disc brake cylinder bore. Occasionally, the disc brake piston-cylinder bore interface becomes corroded or packed with contaminants or sludge, thus posing another obstruction to retracting motion of the piston.

Conventionally, the changing of brake pads on a disc brake caliper assembly was accomplished through the use of a C-clamp or some device operating similarly to a C-clamp. Mechanics found the use of such a C-clamp to be somewhat difficult because of the lack of control associated with it. Such a clamp tends to wander from the center of the piston and could cause damage to the cylinder bore if excessive pressure is applied. Thus, the continual wandering or walking of the C-clamp or other device while trying to depress the piston into the cylinder bore required many resettings to perform the otherwise simple operation of depressing the piston into its retracted position within the piston cylinder bore. Much time and potential damage is associated with the present state of the art. Thus, there is a need for an easy to use, inexpensive, lightweight, compact, easily transportable disc brake piston retraction tool.

SUMMARY OF THE INVENTION

The present invention comprises an apparatus and method for moving a disc brake piston back into a cylinder bore of a fluid containment chamber of a disc brake caliper in order to allow the replacement of worn disc brake pads without manually removing fluid from the system.

A preferred embodiment of the disc brake piston retraction tool is particularly adapted to utilizing a collapsing support wall which will collapse to prevent damage to the piston assembly if the piston's travel is impeded in some manner. The embodiments of the present invention are simple and easy to use for a novice repairmen, inexpensive to manufacture, simple in construction, and can be easily disassembled for carrying or storage in a very compact package.

The present invention operates by use of a rotating threaded collar which is rotated about a bolt having a threaded shaft which operates to lengthen the collar-bolt combination after the end of the collar or collar journal end cap is inserted to press upon either the inside of the disc brake piston, or the disc brake pad while it is installed on the disc brake piston, or on the brake piston bearing plate to cause the forcible retraction of the disc brake piston into the its cylinder bore in the fluid containment chamber of the disc brake caliper.

A bolt retainer or roughened bolt end of the bolt in the bolt-collar combination is situated during operation of the present invention to press upon either a collapsible brace supporting wall supported between the arms of the caliper assembly which are exposed after the disc brake pad opposite the disc brake piston is removed, or the disc brake pad, if the brace supporting wall is not used.

BRIEF DESCRIPTION OF THE DRAWINGS

For a more complete understanding of the present invention and for further advantages thereof, reference is made to the following descriptions of the preferred embodiments taken in conjunction with the accompanying drawings, in which:

Closely related figures have the same number but different alphabetic suffixes.

FIG. 3D is a section view of the disc brake caliper taken along line C-D of FIG. 3A showing the present invention used with a brake piston bearing plate with journal fitted on the disc brake piston and a disc brake collar end cap fitted on the collar of the present invention.

FIG. 3E is a section view of the disc brake caliper taken along line C-D of FIG. 3A showing the present invention used with a disc brake pad left on the disc brake piston.

REFERENCE NUMERALS IN DRAWINGS

10: Disc Brake Piston
11: Disc Brake Rotor
12: Cylinder Bore
13: Wheel Axle
14: Fluid Containment Chamber
16: Disc Brake Pad Attached to Brake Piston
17: Disc Brake Pad Opposite to Disc Brake Piston
18: Brace Support Wall
20: Caliper Arms
22: Hole in Brace Support Wall
24: Bolt Having Threaded Shaft
26: Bolt Retaining Nut
28: Threaded Collar
30: Journal Hole
32: Bolt Retaining Key
34: Journal Collar End Cap
36: Piston Bearing Plate
38: Roughened Bolt End
40: Bolt Retainer
42: Compact Disc Brake Retraction Tool Assembly
44: Hydraulic Fluid Ports
46: Disc Brake Caliper Assembly.

DESCRIPTION OF THE PREFERRED EMBODIMENTS

Referring to the FIGURES, like reference numbers indicate the same elements in the different views of the invention. In FIGS. 1A, 1B, 3B, and 3C, an assembled compact disc brake retraction tool is generally identified by the reference number (42). Closely related figures have the same number but different alphabetic suffixes.

Figure 1A:
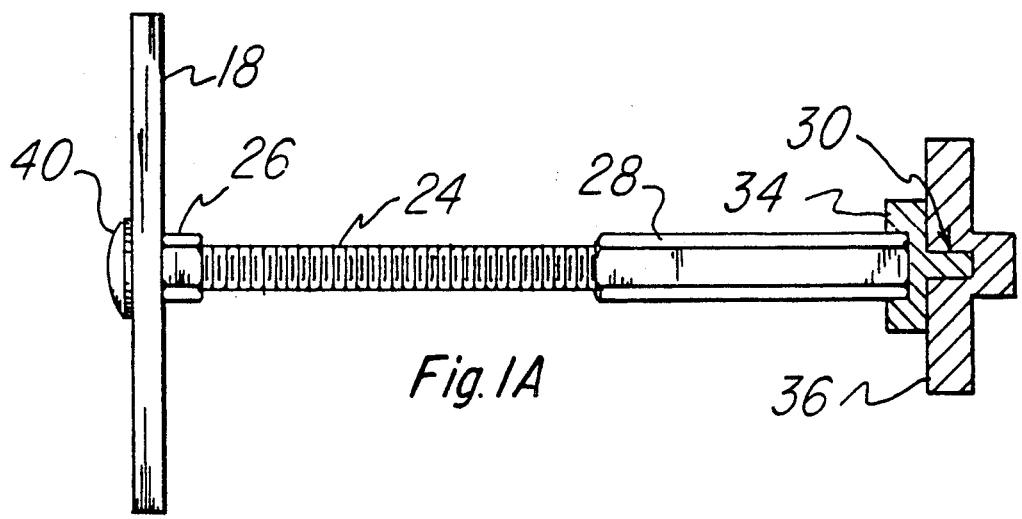
FIG. 1A illustrates one embodiment of the disc brake piston retraction tool in an assembled state.
Figure 1C:
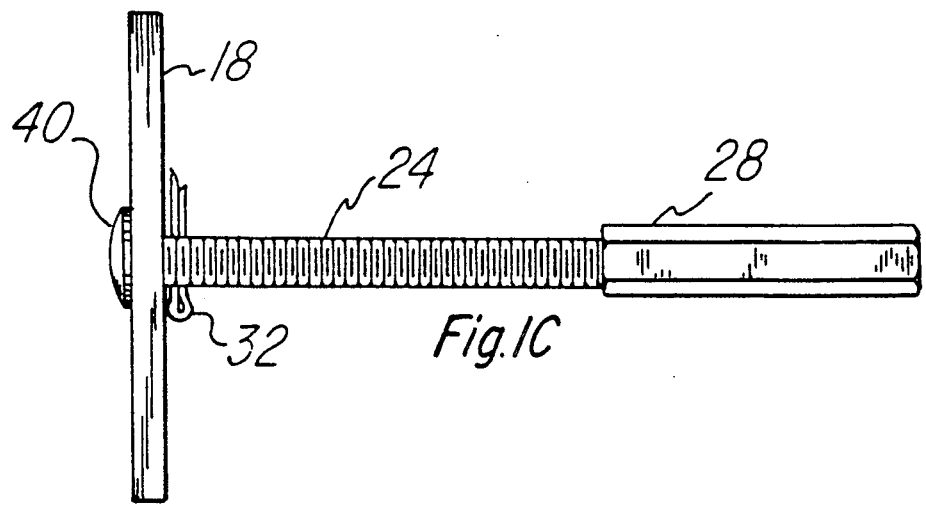
FIG. 1C illustrates a second assembled embodiment of the present invention.
Figure 1D:
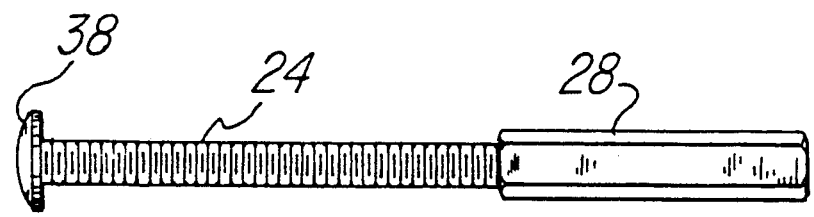
FIG. 1D illustrates a third assembled embodiment of the present invention.
Figure 1B:
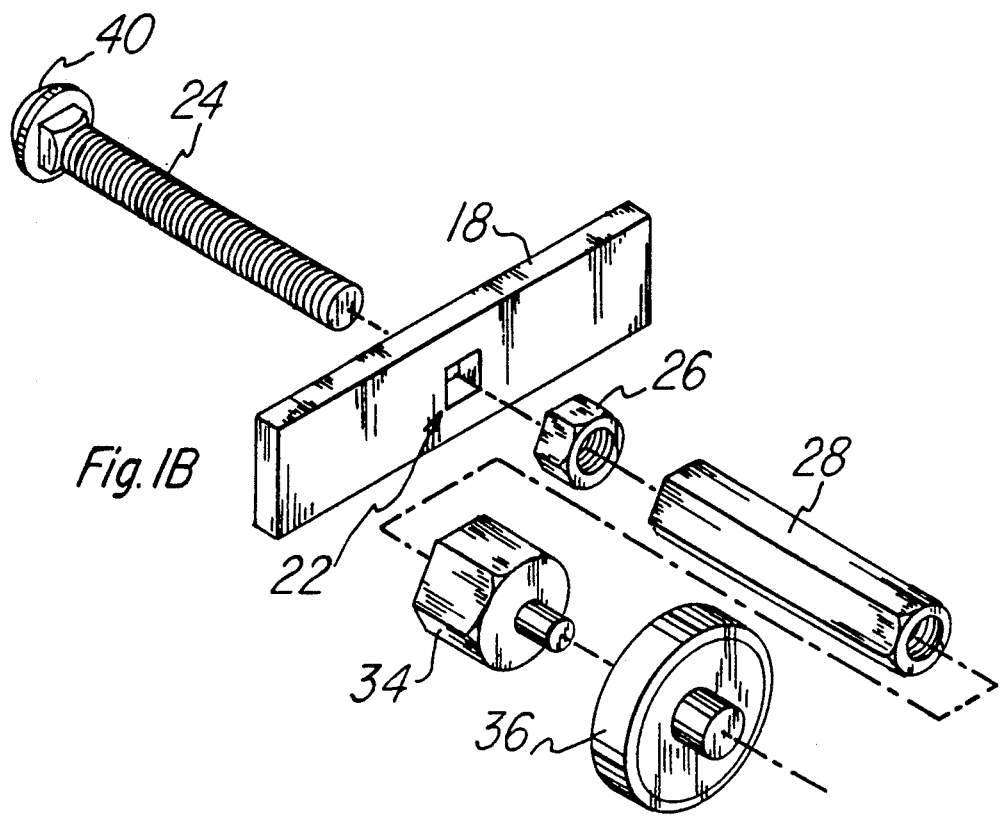
FIG. 1B is an exploded view of the present invention.
Figure 2B:
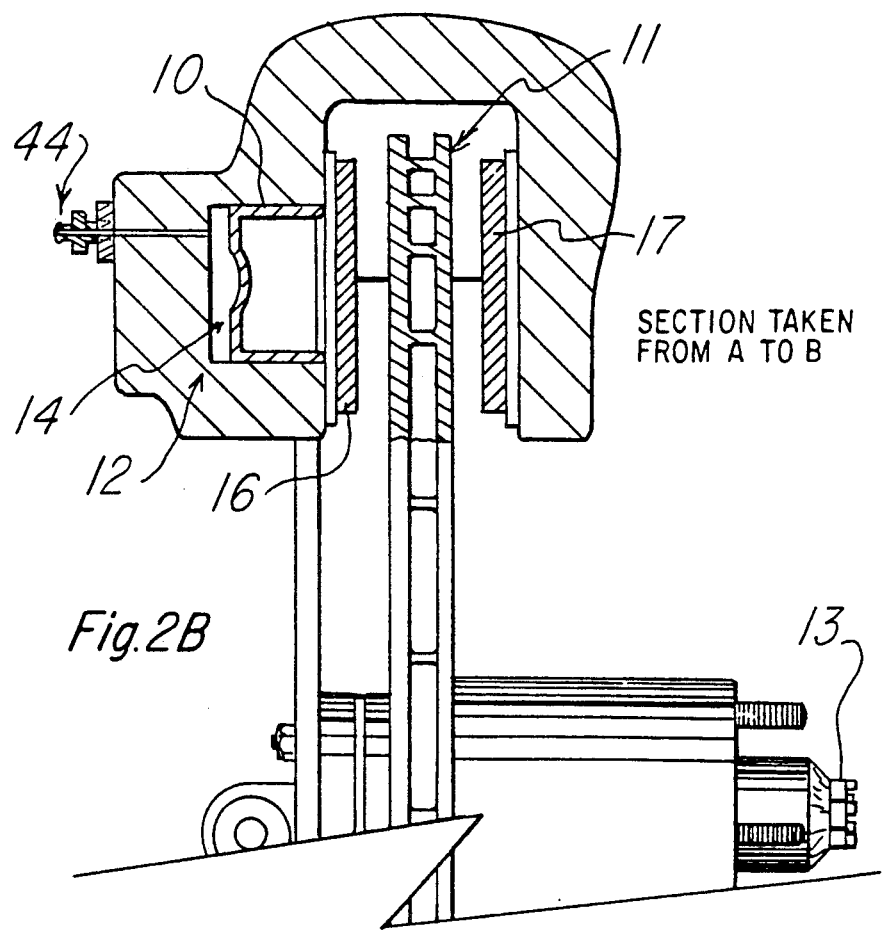
FIG. 2B is a section view of FIG. 2A taken along line A-B.
Figure 2A:
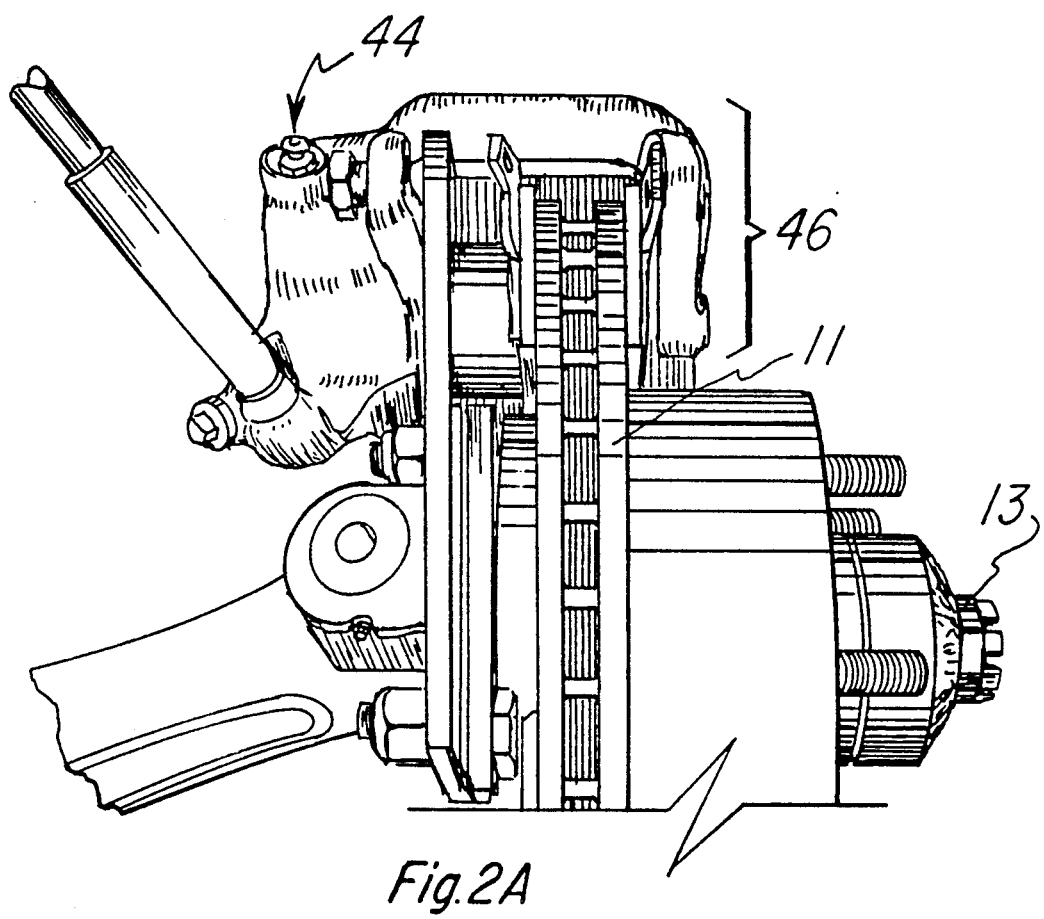
FIG. 2A is a top plan view of a disc brake axle assembly.

FIG. 1A illustrates one embodiment of the present invention in assembled status.

Figure 3A:
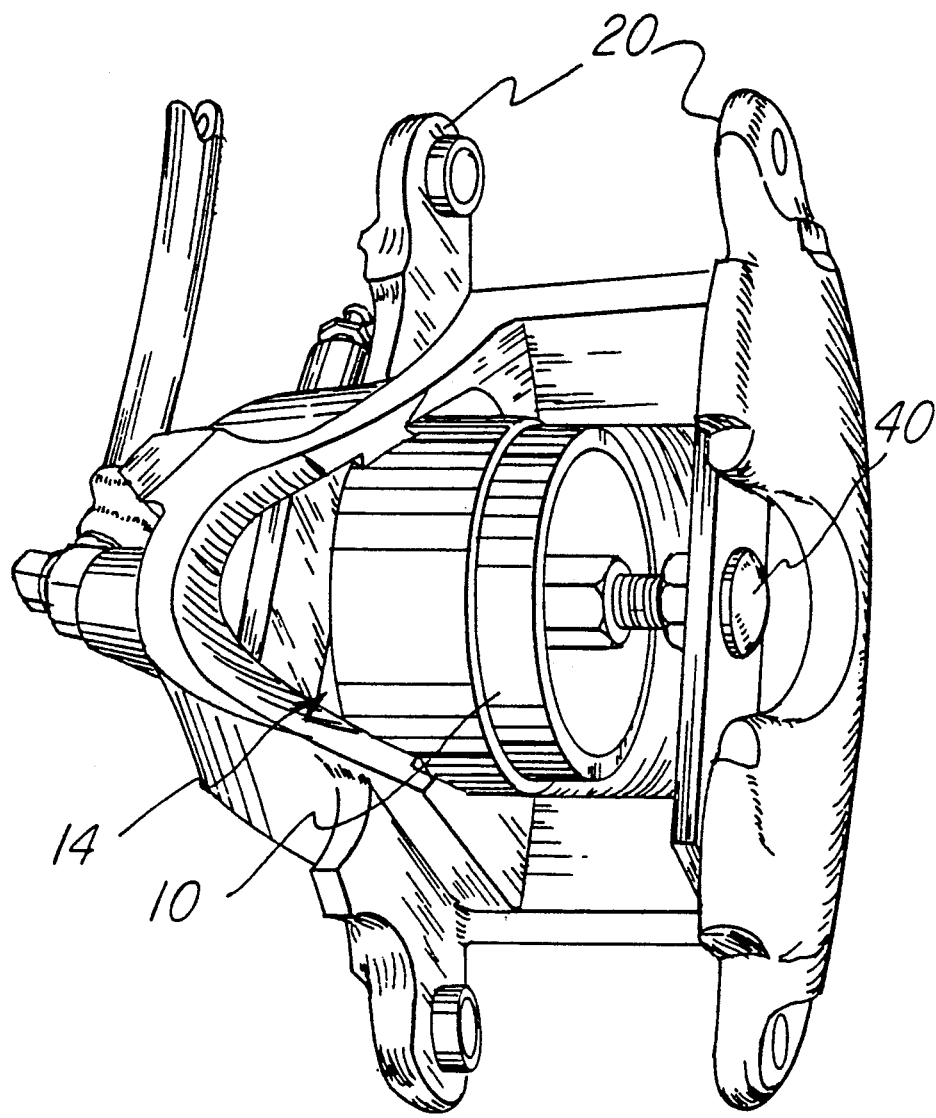
FIG. 3A is a cut-away perspective view of a disc brake caliper assembly dissembled from the rotor and wheel axle with both of the two brake shoes removed and with the disc brake piston retraction tool in place awaiting use.
Figure 3B:
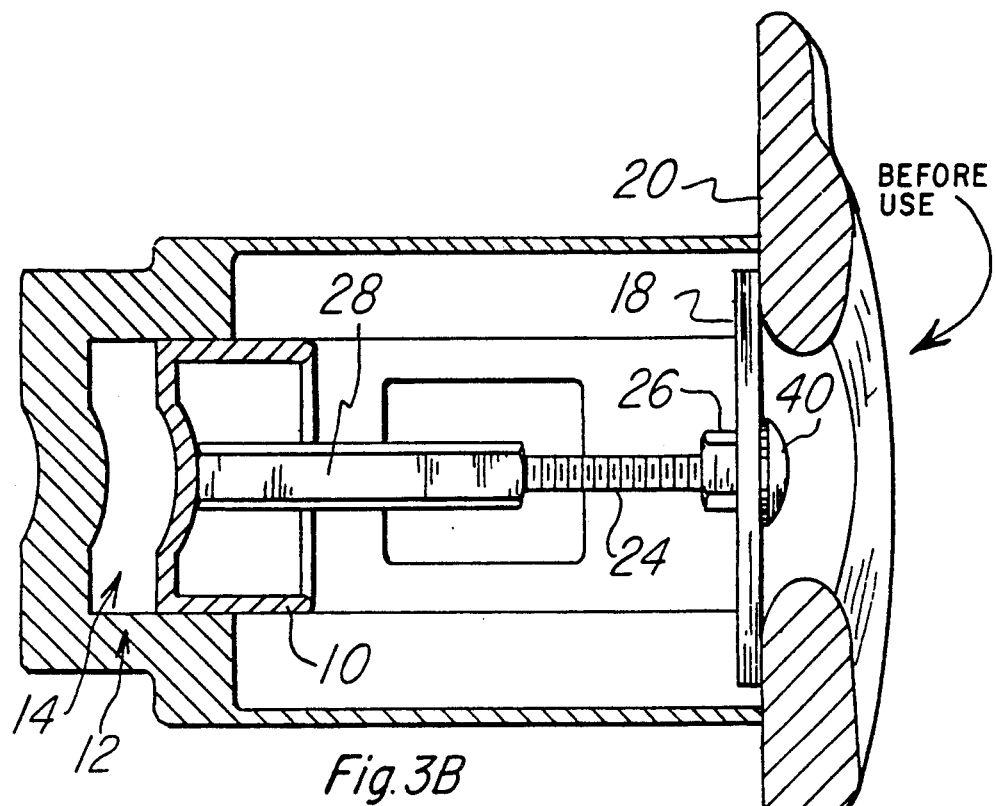
FIG. 3B is a section view of the disc brake caliper taken along line C-D of FIG. 3A before use of the present invention.
Figure 3C:
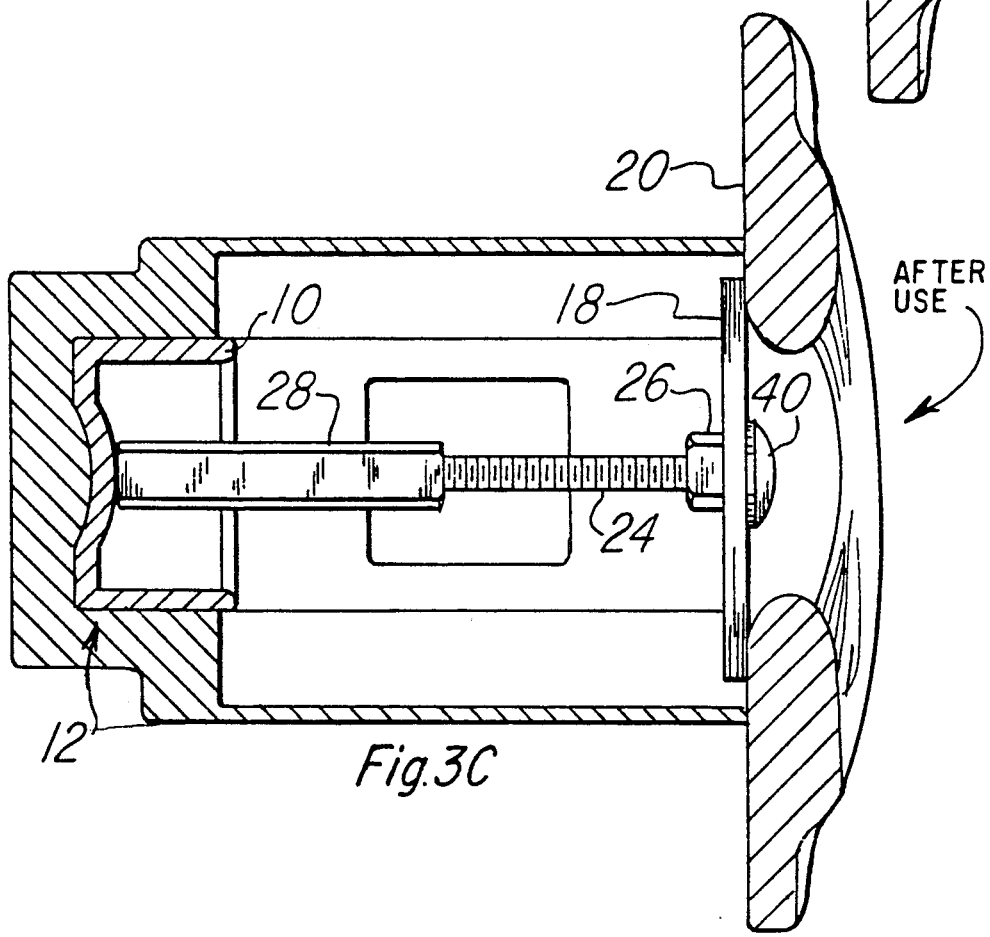
FIG. 3C is a section view of the disc brake caliper taken along line C-D of FIG. 3A after use of the present invention.

FIG. 3B shows an assembled compact disc retraction tool (42) as used to retract or depress the disc brake piston (10) into the bore (12) of the fluid containment chamber (14), while being supported against caliper arms (20) by brace support wall (18).

In all embodiments, the objective of the invention is to move a disc brake piston (10), slidably positioned in a cylinder bore (12) of a fluid containment chamber (14) of a disc brake caliper assembly (46) into the said cylinder bore (12) for replacing worn disc brake pads (16 & 17) and thereby renew braking efficiency without manually removing hydraulic fluid from the system.

In operation, in all embodiments, the threaded collar (28) is rotated about threaded bolt (24) in order to cause the length of the bolt-collar assembly to increase thereby exerting pressure on the brace support wall (18), or disc brake pad (17); and the opposing disc brake pad (16), piston (10), or piston bearing plate (36), thereby causing the piston (10) to be forced into the cylinder bore (12).

In one embodiment, as shown in FIG. 3B, the compact disc brake piston retraction tool assembly (42) comprises a threaded collar (28) which can be rotated with a tool, which is rotated onto a bolt having a bolt retainer (40) and a threaded shaft (24), which is inserted through a hole in the brace support wall (22) and secured to the brace support wall (18) by a nut retainer (26) for the said brace support wall (18).

In operation of this embodiment of the invention shown in FIG. 3B, a threaded collar (28) is rotated about a bolt having a threaded shaft (24) while a brace support wall (18) is placed against at least two arms of a disc brake caliper (20) in an opening opposite to a disc brake piston (10) which exists after a disc brake pad (17) on the side of the caliper opposite to the disc brake piston (10) is removed.

The brace support wall (18) contains a hole so that the axis of an article inserted through the hole will be in substantial axial alignment with the axis of travel of the disc brake piston (10). The brace support wall should be of a thickness less than the thickness of a disc brake pad (16 and 17) in its unworn state and of such length to permit its bridging the opening between the arm of the disc brake caliper (20) with the worn disc brake pad (17) removed. The width of the brace support wall (18) should be substantially less than its length so that the brace support wall (18) will be enabled to fit into the space vacated by a worn disc brake pad (17).

The threaded collar (28) should be of such length as to be able to retract and be placed into contact with the inside surface of the disc brake piston (10) and long enough to extend sufficiently, upon turning to fully force the disc brake piston (10) into the said cylinder bore (12) without manually removing hydraulic fluid from the system, while permitting a sufficient length of the threaded collar (28) to protrude from the disc brake piston (10) to allow the threaded collar (28) to be turned by a tool to exert pressure axially along the axis of travel of the disc brake piston (10) against the inside surface of the disc brake piston (10). This pressure can be exerted against the inside of the piston (10) or against a disc brake pad (16), or against a piston bearing plate (36) by the threaded collar (28) acting through the journal collar end cap (34) against the journal in the piston bearing plate (36).

Figure 3F:
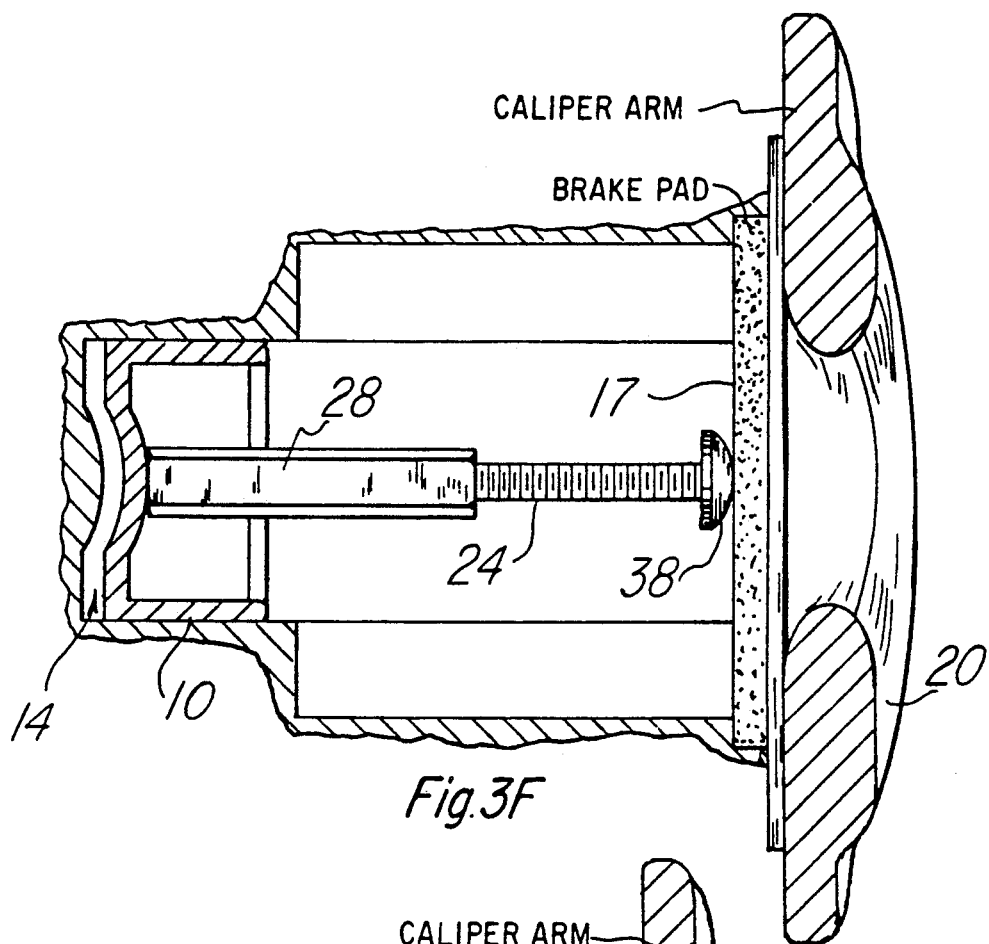
FIG. 3F is a section view of a disc brake caliper taken along line C-D of FIG. 3A showing one embodiment of the present invention but with a disc brake pad left on the side of the caliper arm opposite to the disc brake piston and using no brace support wall.
Figure 3G:
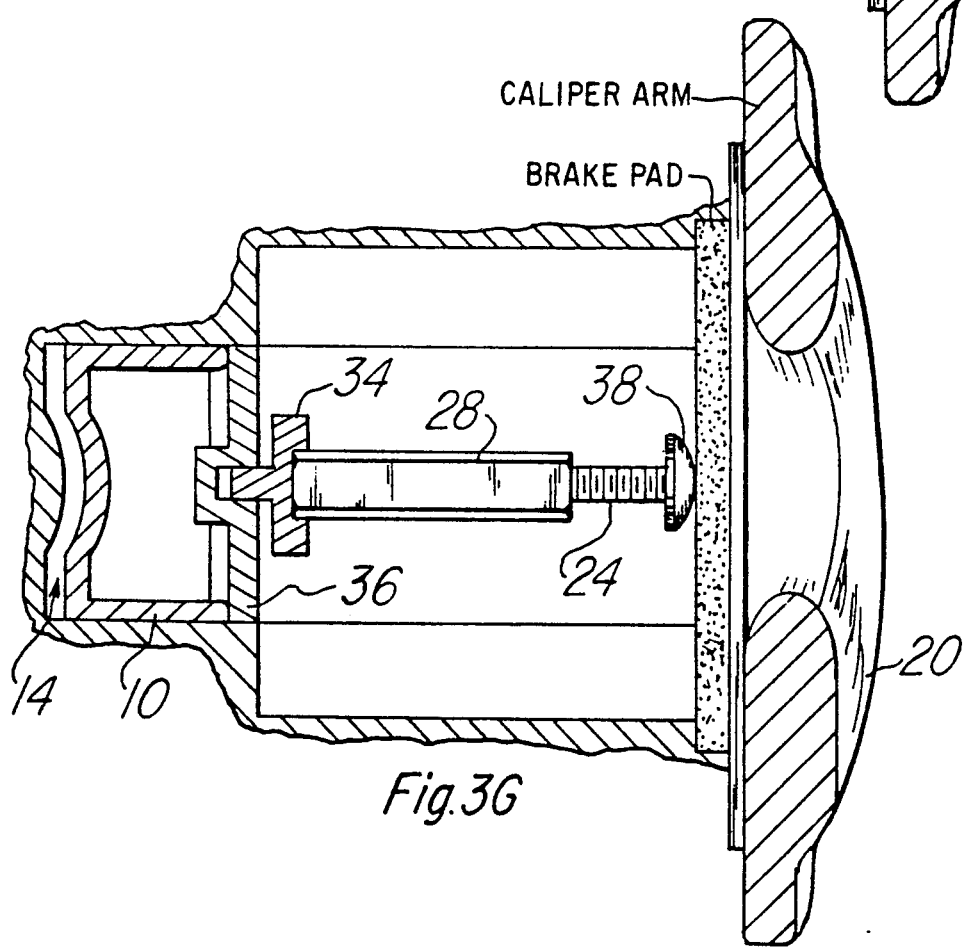
FIG. 3G is a section view of a disc brake caliper taken along line C-D of FIG. 3A showing one embodiment of the present invention, using no brace support wall, which uses a brake piston bearing plate with a journal to contact the disc brake piston and a journal collar end cap fitted on the collar of the present invention.

In operation in another embodiment of the present invention, as shown in FIG. 3F, the roughened end (38) of the threaded bolt (24) rests on the brake pad (17) opposite to brake piston (10) and the threaded collar (28) is rotated onto the bolt (24) and turned with a tool so that the end of the threaded collar (28) presses against either the inside of the piston (10), the brake pad attached to the piston (16) (See FIG. 3E), or a journal collar end cap (34) fitted into a brake piston bearing plate (36) (See FIG. 3G), causing the brake piston (10) to be forced into the cylinder bore (12).

In the preferred embodiments, the threaded bolt (24) and the threaded collar (28) are both composed of stainless steel or other smooth high strength non-corrosive materials. The brace support wall (18) is preferably composed of a rectangular flat segment of nylon plastic, of which one type is trade named ABS MATERIAL, but can be composed of metal or other rigid material.

In order to use the present invention, most easily, the disc brake caliper assembly (46) should be removed from the wheel axle (13). The disc brake tool is then applied inside the disc brake caliper assembly (46) by either removing from the caliper, none, one, or both of the old brake pads (16) or (17) to be replaced before using the present invention to retract the piston (10) to enable the attachment of new thicker pads (16) and (17) to the caliper.

The parts of the present invention can be easily replaced with longer, shorter, or larger parts so that the invention can be easily used on any size brake assembly, and to facilitate repair of the invention in case some part of the invention becomes worn out or damaged.

Additionally, the parts of the present invention can be easily disassembled and rapidly and easily reassembled for shipping and for ease of storage between use or for carrying on the body of the person using the invention.

As a safety feature of the present invention, the brace support wall (18), when used, can be composed of hard nylon plastic or other rigid material which will deform if undue stress or pressure is applied to the piston by the collar-bolt assembly during operation thereby exerting pressure on the brace support wall (18) against the caliper arms (20) of the caliper assembly (46).

Although the present invention has been described with respect to several specific embodiments, various changes and modifications may be suggested to one skilled in the art to adapt the present invention for use on other disc brake systems.

Although the description above contains many specificities, these should not be construed as limiting the scope of the invention, but as merely providing illustrations of some of the presently preferred embodiments of this invention. For example, the threaded collar (28) can be either round or multi-faceted to enable a wrench or other tool to more easily grasp and turn the threaded collar (28), and the brace support wall (18) can be attached to the threaded bolt in a variety of other ways instead of with a bolt retaining nut (26) or bolt retaining key (32). Namely, the brace support wall (18) can be attached to the threaded bolt (24) with a bolt retaining nut (26), bolt retaining key 932), or merely pressed onto or glued to the threaded bolt (24).

Thus, the scope of the invention would be determined by the appended claims and their legal equivalents, rather than by the examples given.

I claim:

1. An apparatus for moving a disc brake piston, slidably positioned in a cylinder bore of a fluid containment chamber of a disc brake caliper, into said cylinder bore for replacing worn disc brake pads and thereby renewing braking efficiency, after the worn disc brake pad has been removed from the side of the disc brake caliper opposite the disc brake piston, comprising:

a brace support wall which bridges an opening formed between at least two arms of said disc brake caliper, and is braced against said arms of said caliper opening opposite to said disc brake piston, which exists after said disc brake pad on the side of the caliper opposite to said piston is removed, said support wall having a hole at a generally central point along the wall surface, such that the axis of an article inserted through the hole is in substantial axial alignment with the axis of travel of said disc brake piston, when the brace support wall is engaged with said two arms of the disc brake caliper, said brace support wall having a thickness that is less than the thickness of said removed disc brake pad in its unworn state, said brace support wall being of such length to permit its bridging the opening between the arms of the said disc brake caliper with the worn disc brake pad removed, the width dimension of said brace support wall being substantially less than its length, so that the brace support wall is enabled to fit into the space vacated by a worn disc brake pad;

a bolt having a shaft, said shaft being threaded along at least some of its length said bolt also having a bolt retainer at one end of the shaft to prevent the bolt from completely traveling through said hole in said brace support wall, and one non-obstructed end so that said bolt may be inserted through said hole in the brace support wall and said bolt retainer can be retained against said brace support wall, said bolt having a length such that in combination with the length of a collar the bolt length will permit the easy insertion of the collar into said inside surface of said disc brake piston and yet long enough to permit the full depression of said disc brake piston into said cylinder bore of the fluid containment chamber;

a retaining device which is engaged from the non-obstructed bolt end which operates to keep said threaded bolt retained in contact with said brace support wall;

a threaded collar which is threaded onto said bolt so that one end of said threaded collar is engaged with the inner surface of said disc brake piston so that upon turning of the said threaded collar, said threaded collar exerts an axial pressure along the axis of travel of said disc brake piston sufficient to cause the collar to force said disc brake piston into said cylinder bore without manually removing fluid from said fluid containment chamber or fluid reservoir for the braking system, the threaded collar being of such length as to be able to be short enough to retract and be placed into contact with the inside surface of said disc brake piston, and long enough to extend sufficiently, upon turning, to fully force the disc brake piston into said cylinder bore, while permitting a sufficient length of the collar to protrude from the disc brake piston to allow it to be turned by a tool to exert pressure axially along the axis of travel of the disc brake piston against the inside surface of the disc brake piston.

2. The apparatus of claim 1, wherein the worn disc brake pad is not removed from the same side of the caliper as the disc brake piston; and the end of said collar operates on the worn disc brake pad to exert pressure to force said disc brake piston back into said cylinder bore.

3. The apparatus of claim 1, wherein the brace support wall is made of metal or other non-yielding material.

4. The apparatus of claim 1, wherein the brace support wall is made of plastic or other material which is calculated to yield or bend at a preset pressure to reduce the danger of damage to the piston and as an indication that further repairs are necessary to the disc brake caliper assembly.

5. The apparatus of claim 1, wherein the retaining device securing the bolt to the brace support wall is a nut screwed onto the threads of said bolt.

6. The apparatus of claim 1, wherein the retaining device securing the bolt to the brace support wall is a pin inserted through a hole in said bolt.

7. The apparatus of claim 1, wherein the collar has a plurality of surface facets to reduce slippage of the tool when the collar is being turned with a tool.

8. The apparatus of claim 1, wherein the worn disc brake pad is not removed from the same side of the caliper as the disc brake piston; and the end of the said collar is modified, by an attachment or otherwise, to fit into a journal hole in a plate which fits against and operates on the worn disc brake pad to exert pressure to force the disc brake piston back into said cylinder bore.

9. The apparatus of claim 1, wherein the worn disc brake pad is removed from the same side of the caliper as the disc brake piston; and the end of the said collar is modified, by an attachment or otherwise, to fit into a journal hole in a plate which fits against and operates on the lip edges of the disc brake piston to exert pressure to force the disc brake piston back into said cylinder bore.

10. An apparatus for moving a disc brake piston, slidably positioned in a cylinder bore of a fluid containment chamber of a disc brake caliper, into said cylinder bore for replacing worn disc brake pads and thereby renewing braking efficiency, while the worn disc brake pad is still installed on the side of the disc brake caliper opposite the disc brake piston comprising:

a bolt with one scored or roughened end to prevent its rotation having a shaft, said shaft being threaded along at least some of its length, said scored or roughened end being placed against said worn disc brake pad, on a side of a caliper assembly opposite to said disc brake piston, so that said bolt remains in contact with said worn disc brake pad, said bolt having a length such that in combination with the length of a collar it will permit the easy insertion of the collar into said inside surface of the disc brake piston and yet long enough to permit the full depression of said disc brake piston into said cylinder bore of the fluid containment chamber;

a collar threaded onto said bolt so that one end of said collar is engaged with the inner surface of said disc brake piston so that upon turning of the collar, the collar exerts an axial pressure along the axis of travel of said disc brake piston sufficient to cause the collar to force the disc brake piston into said cylinder bore without manually removing fluid from said fluid containment chamber or fluid reservoir for the braking system, the threaded collar being of such length as to be able to be short enough to retract and be placed into contact with the inside surface of said disc brake piston, and long enough to extend sufficiently, upon turning, to fully force the disc brake piston into said cylinder bore, while permitting a sufficient length of the collar to protrude from the disc brake piston to allow it to be turned by a tool to exert pressure axially along the axis of travel of the disc brake piston against the inside surface of the disc brake piston.

11. The apparatus of claim 10, wherein the collar has a plurality of surface facets to reduce slippage of the tool when the collar is being turned with a tool.

12. The apparatus of claim 10, wherein the worn disc brake pad is not removed from the same side of the caliper as the disc brake piston; and the end of said collar is modified, by an attachment or otherwise, to fit into a journal hole in a bearing plate which fits against and operates on the worn disc brake pad to exert pressure to force the disc brake piston back into said cylinder bore.

13. The apparatus of claim 10, wherein the worn disc brake pad is removed from the same side of the caliper as the disc brake piston; and the end of said collar is modified to fit into a journal hole in a bearing plate which fits against and operates on the lip edges of the disc brake piston to exert pressure to force the disc brake piston back into said cylinder bore.

14. The apparatus of claim 10, wherein the worn disc brake pad is not removed from the same side of the caliper as the disc brake piston; and the end of the said collar operates on the worn disc brake pad to exert pressure to force the disc brake piston back into said cylinder bore.

15. A method of moving a disc brake piston, slidably positioned in a cylinder bore of a fluid containment chamber of a disc brake caliper, into said cylinder bore for replacing worn disc brake pads and thereby renewing braking efficiency, after the worn disc brake pad has been removed from the side of the disc brake caliper opposite the disc brake piston, comprising the steps of:

bracing a brace support wall which bridges an opening formed between at least two arms of said disc brake caliper, against said arms of said caliper opening opposite to said disc brake piston, which exists after said disc brake pad on the side of the caliper opposite to said piston is removed, said support wall having a hole at a generally central point along the wall surface, such that the axis of an article inserted through the hole is in substantial axial alignment with the axis of travel of said disc brake piston, when the brace support wall is engaged with said two arms of the disc brake caliper, said brace support wall having a thickness that is less than the thickness of said removed disc brake pad in its unworn state, said brace support wall being of such length to permit its bridging the opening between the arms of said disc brake caliper with the worn disc brake pad removed, the width dimension of said brace support wall being substantially less than its length, so that the brace support wall is enabled to fit into the space vacated by a worn disc brake pad;

inserting into the caliper assembly a bolt having a shaft which is threaded along at least some of its length, and a bolt retainer at one end of the shaft to prevent the bolt from completely traveling through said hole in said brace support wall, and one non-obstructed end so that the bolt may be inserted through said hole in the brace support wall and said bolt retainer can be retained against said brace support wall, said bolt having a length such that in combination with the length of a collar the bolt length will permit the easy insertion of the collar into said inside surface of the disc brake piston and yet long enough to permit the full depression of said disc brake piston into said cylinder bore of the fluid containment chamber;

retaining said bolt retainer in contact with said brace support wall with another retainer engaged from the;

rotating a collar threaded onto said bolt so that one end of the collar is engaged with the inner surface of said disc brake piston so that upon turning of the collar, the collar exerts an axial pressure along the axis of travel of said disc brake piston sufficient to cause the collar to force the disc brake piston into said cylinder bore without manually removing fluid from said fluid containment chamber or fluid reservoir for the braking system, the threaded collar being of such length as to be able to be short enough to retract and be placed into contact with the inside surface of said disc brake piston, and long enough to extend sufficiently, upon turning, to fully force the disc brake piston into said cylinder bore, while permitting a sufficient length of the collar to protrude from the disc brake piston to allow it to be turned by a tool to exert pressure axially along the axis of travel of the disc brake piston against the inside surface of the disc brake piston.

16. A method of moving a disc brake piston, slidably positioned in a cylinder bore of a fluid containment chamber of a disc brake caliper assembly, into said cylinder bore for replacing worn disc brake pads and thereby renewing braking efficiency, while the worn disc brake pad is still installed on the side of the disc brake caliper opposite the disc brake piston comprising the steps of:

inserting into said caliper assembly, a bolt with one scored or roughened end to prevent its rotation, having a shaft which is threaded along at least some of its length, said roughened end being placed against said worn disc brake pad opposite to the disc brake piston, so that it remains in contact with the worn disc brake pad, said bolt having a length such that in combination with the length of said collar it will permit the easy insertion of the collar into said inside surface of the disc brake piston and yet long enough to permit the full depression of said disc brake piston into said cylinder bore of the fluid containment chamber;

rotating a collar threaded onto said bolt at its other end so that one end of said threaded collar is engaged with the inner surface of said disc brake piston so that upon turning of the collar, the collar exerts an axial pressure along the axis of travel of said disc brake piston sufficient to cause the collar to force the disc brake piston into said cylinder bore without manually removing fluid from said fluid containment chamber or fluid reservoir for the braking system, the threaded collar being of such length as to be able to be short enough to retract and be placed into contact with the inside surface of said disc brake piston, and long enough to extend sufficiently, upon turning, to fully force the disc brake piston into said cylinder bore, while permitting a sufficient length of the collar to protrude from the disc brake piston to allow it to be turned by a tool to exert pressure axially along the axis of travel of the disc brake piston against the inside surface of the disc brake piston.

* * * * *